United States Patent [19]
Erickson et al.

[11] Patent Number: 5,154,478
[45] Date of Patent: Oct. 13, 1992

[54] REMOVABLE LINER FOR PICKUP BOX

[75] Inventors: Glenn P. Erickson, Thief River Falls; Gregory J. Ehalt, Long Lake, both of Minn.

[73] Assignees: Pawnee Rotational Molding, Maple Plain; G-Line, Inc., Thief River Falls, both of Minn.

[21] Appl. No.: 664,209

[22] Filed: Mar. 4, 1991

[51] Int. Cl.⁵ .............................................. B60R 27/00
[52] U.S. Cl. ....................................... 296/39.2; 296/164
[58] Field of Search ............................ 296/39.2, 164, 167

[56] References Cited

U.S. PATENT DOCUMENTS

| | | |
|---|---|---|
| Re. 32,198 | 7/1986 | Wayne . |
| D. 224,219 | 7/1972 | Ritter . |
| D. 271,009 | 10/1983 | Fishler ........................ 296/39.2 X |
| 3,881,768 | 5/1975 | Nix . |
| 4,047,749 | 9/1977 | Lambitz et al. ................ 296/39.2 |
| 4,181,349 | 1/1980 | Nix et al. ...................... 296/39.2 |
| 4,239,430 | 12/1980 | Groene ........................ 296/167 X |
| 4,247,145 | 1/1981 | Groene ........................ 296/167 X |
| 4,592,583 | 6/1986 | Dresen et al. .................. 296/39.2 |
| 4,604,013 | 8/1986 | Elwell et al. . |
| 4,623,187 | 11/1986 | Ibrahim . |
| 4,750,776 | 6/1988 | Barben ........................ 296/39.2 |
| 4,767,149 | 8/1988 | Rye ............................ 296/39.2 |
| 4,796,914 | 1/1989 | Raynor . |
| 4,887,947 | 12/1989 | Bott .......................... 296/39.2 X |
| 4,893,862 | 1/1990 | Hollenbaugh, Sr. . |
| 4,909,559 | 3/1990 | Zettle . |
| 4,911,493 | 3/1990 | Muirhead . |
| 4,915,556 | 4/1990 | Unger . |
| 4,936,724 | 6/1990 | Dutton . |
| 4,958,876 | 9/1990 | Diaco et al. . |
| 4,997,227 | 3/1991 | Falzone et al. ................ 296/39.2 |

Primary Examiner—Margaret A. Facarino
Assistant Examiner—Joseph D. Pape
Attorney, Agent, or Firm—Moore & Hansen

[57] ABSTRACT

A protective liner for use in cargo beds of pickup trucks, the liner having integral storage compartments and being easily removable from the pickup truck carbo bed without the need of removing the contents of the liner before removal. A peripheral upper flange containing channel iron provides support for the bed liner and also provides a means for attaching jacks for lifting the bed liner from the carbo bed of the pickup truck.

23 Claims, 6 Drawing Sheets

REMOVABLE LINER FOR PICKUP BOX

BACKGROUND OF THE INVENTION

1. Technical Field

The present invention relates generally to protective inserts for use with pickup truck cargo beds, such protective inserts being generally known as bed liners. More specifically, the invention relates to bed liners, preferably having integral storage compartments, that are removable from the storage bed of the pickup truck without removing the contents being stored thereon.

2. Background Information

Pickup trucks enjoy widespread popularity in the United States as both a work and leisure related utility vehicle, frequently being called on to meet the demands of hauling tools or machinery one day and camping gear or sporting equipment the next. Because pickup truck owners wish to protect their vehicles from the incidental nicks and dings that accompany frequent and demanding use of the pickup truck's cargo bed, the use of various types of protective bed liners in pickup truck cargo beds is commonly known. A representative example of the prior art is U.S. Pat. No. 4,958,876, issued to Diaco et al. on Sept. 25, 1990. As may be seen in Diaco et al., the use of reinforcing ribs along the sides and floor of the bed liner is commonly known for additional support and extended wear. Further, as is also shown in Diaco et al., the use of storage containers having dimensions that cooperate with the bed liner is also well known. Such storage containers or other load restraining devices may be retained in position with so-called load locks that permit the attachment of various load restraining means to the bed liner. Diaco et al. also shows the use of a horizontal ridge along the sides of the bed liner that permits a sheet of plywood, for example, to be positioned thereon, dividing the cargo bed into upper and lower compartments. However, Diaco et al. does not teach the use of a storage container that is integral with or built into the bed liner itself.

Another representative example of the state of the bed liner art is U.S. Pat. No. 4,893,862, issued to Hollenbaugh, Sr. on Jan. 16, 1990, which discloses a removable cargo bed liner with sides that may be folded over onto each other. However, the removable bed liner of Hollenbaugh, Sr., while capable of compact storage after removal from a vehicle cargo bed, is not capable of continuing storage of the items that were stored thereupon after removal from the vehicle cargo bed.

U.S. Pat. No. 3,881,768, issued to Nix on May 6, 1975, also discloses a pickup truck bed liner that may be removed from the vehicle cargo bed. However, no means is disclosed for removing the bed liner from the vehicle cargo bed without first removing all but perhaps the smallest contents from the bed liner.

U.S. Pat. No. Des. 271,009, issued to Fishler on Oct. 18, 1983, discloses a design for a combined truck bed liner and tool chest. However, the design of Fishler discloses a tool chest that appears detached from the bed liner, joined only by a common peripheral lip or flange, and is not unitary with the bed liner as a whole.

U.S. Pat. No. Des. 224,219, issued to Ritter on July 11, 1972, discloses a design for a pickup truck bed liner that includes an indented portion, the rear edge of which appears to coincide with the rear edge of the wheel wells of the cargo bed. While some indented portion is desirable to ease the removal of the bed liner from the cargo bed, no means for removing the Ritter bed liner is disclosed, and neither is there disclosed means for removing the bed liner from the vehicle cargo bed.

The removable cargo bed liner of the present invention overcomes the difficulties described above and affords other features and advantages previously not available.

SUMMARY OF THE INVENTION

The invention includes a floor portion overlying the floor wall of the pickup truck cargo bed, and three upright sidewalls abutting the opposing sidewalls and the frontwall of the pickup truck cargo bed. The preferred embodiment of the device is manufactured using a process known as rotational molding, which permits double sided construction of all sides and the floor of the bed liner, as well as benefits in the strength of the bed liner, especially at the corners where conventionally molded bed liners are frequently weaker because of an insufficient amount of material. Most importantly, however, rotational molding permits storage compartments to be constructed between the inner and outer walls of the frontwall and opposing sidewalls of the bed liner, making the storage compartments integral with the bed liner. A removable bed liner according to the invention also may be manufactured by conventional methods and materials such as vacuum molding plastic or fiberglass.

Molded into the upper edges of at least each opposing sidewall is a sturdy support means such as channel iron. A similar support means also may be molded into the upper edge of the frontwall for additional support. At each of the four corners of the upper edge of the removable bed liner are openings communicating with the upper edge and any support means found therein. These openings permit the insertion of a lifting means such as an iron rod attachable to a jack, whereby the lifting means may be used to elevate the removable bed liner a height sufficient to drive the pickup truck to which it was attached out from under the bed liner. In its preferred embodiment, the bed liner will be of sufficient strength to permit any contents stored thereon to be left in the bed liner while it is supported by the lifting means.

It is an object of the invention to provide a device and method for using the device that provides a convenient means for storing the items regularly carried in a vehicle cargo bed when the vehicle is needed for another purpose. Such a case may arise when a vehicle most frequently used for transporting tools or machinery is needed for a leisure activity such as camping, when it will be used for transporting tents or sleeping bags. Rather than having to remove individually each of the items found in the vehicle cargo bed when it is time to use the vehicle for the alternate activity, the entire bed liner may be removed at once in a single, easy procedure. The value of having available such a time saving device increases as the size of the items normally stored on the bed liner gets smaller or as the weight of the items normally stored on the bed liner gets heavier.

Many pickup truck owners also affix a rigid protective covering generally known as a topper to their vehicle cargo bed walls. Such toppers generally extend upward from the walls of the cargo bed to a height approximating that of the cab of the pickup truck, and in the case of toppers used for camping, for example, may be even taller than that. Toppers such as these are usually mounted to the cargo bed walls by mounting means cooperating with stake holes found in the upper edges of the sides of the cargo bed walls. It is a further object of this invention to provide a removable cargo bed liner to which a topper may be attached and that may be removed from the vehicle cargo bed without the necessity of first removing the topper from the bed liner.

It is a further object of this invention to provide means for forming multiple temporary compartments within the bed liner to provide greater protection to cargo of a variety of shapes and sizes.

Other objects and advantages of the invention will become apparent from the following detailed description and from the appended drawings in which like numbers have been used to describe like parts throughout the several views.

DESCRIPTION OF THE PREFERRED EMBODIMENT

Figures 1, 2, 3:
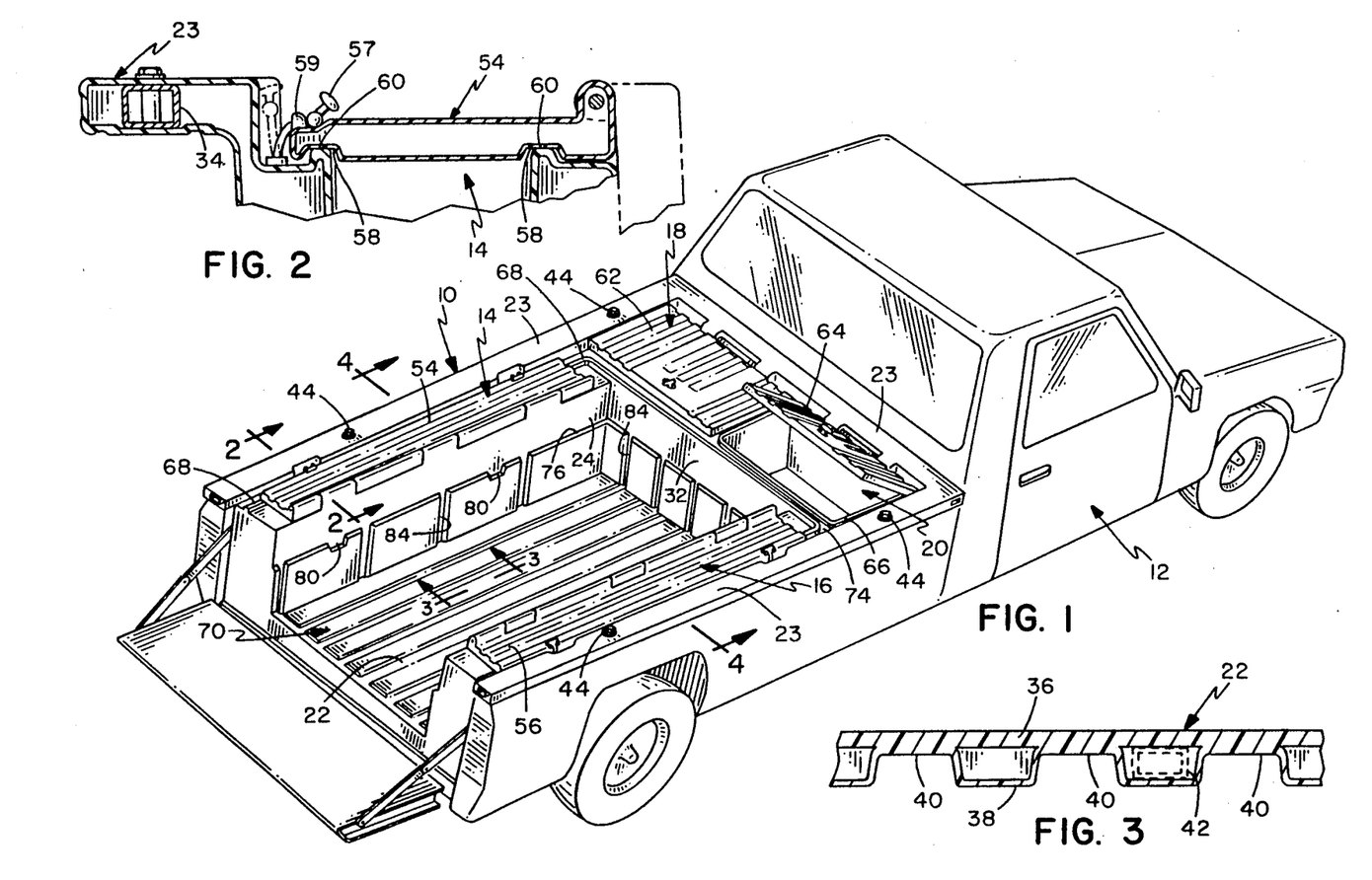
FIG. 1 is a perspective view of a pickup truck having a removable bed liner according to the preferred embodiment of the present invention mounted thereto.
FIG. 2 is a section view taken along line 2—2 of FIG. 1 showing details of the cover of the side storage compartments and the flange of the removable bed liner.
FIG. 3 is a section view taken along line 3—3 of FIG. 1 showing the rib construction of the floor of the removable bed liner.

With reference to the drawings, and in particular to FIG. 1, the removable protective bed liner of the current invention is generally indicated by reference numeral 10. The preferred embodiment of removable bed liner 10 is formed to fit in the cargo bed of a pickup truck 12 or similar vehicle, and includes first and second side storage compartments 14 and 16, respectively, and first and second end storage compartments 18 and 20, respectively. Also included is a bed liner floor 22. Projecting outwardly from the upper periphery of bed liner 10 is a lip or flange 23. These components of removable bed liner 10 correspond with and substantially abut against the structural elements of pickup truck 12 that define its cargo bed, including the floor wall, the first and second opposing cargo bed sidewalls, the first and second rear wheel wells, the cargo bed frontwall, and the cargo bed tailgate 25.

Removable bed liner 10 is preferably rotationally molded of a polyethylene such as linear low density polyethylene (LLDPE). The rotational molding process is preferred because it results in a product having a double wall construction. As most clearly illustrated in FIG. 4, this process results in the positioning of first side storage compartment 14 between first inner wall 24 and first outer wall 26. Similarly, second side storage compartment 16 is positioned between second inner wall 28 and second outer wall 30, and end storage compartments 18, 20 are positioned between front inner wall 32 and a front outer wall 33.

Figure 4:
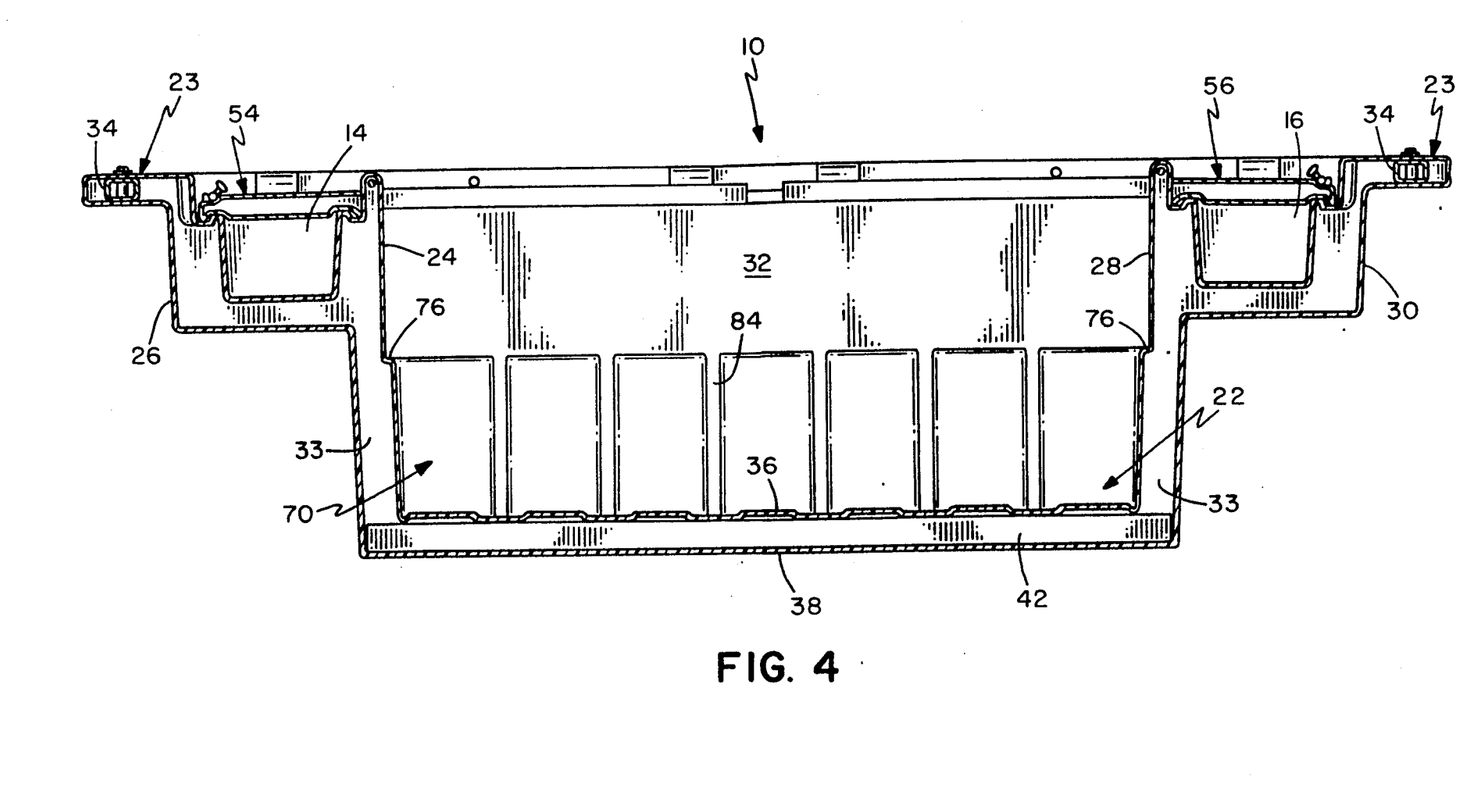
FIG. 4 is a section view taken along line 4—4 of FIG. 1.

As seen in several views, including FIG. 4, the double wall construction resulting from the rotational molding process results in several gaps and voids within bed liner 10, none of them, of course, exposed to the outside. However, since the rotational molding process also easily accommodates molded-in inserts, these recesses may be used for containing reinforcement means such as iron bars or channels at strategic locations. As shown, for example, in FIGS. 2 and 4, a channel iron 34 is positioned within flange 23. The preferred dimensions of channel iron 34 are approximately 1 inch by 1½ inches, with a wall thickness of approximately ⅛ inch. Channel iron 34 is preferably located within flange 23 along at least both opposing sides of bed liner 10, and it may run about the entire periphery of bed liner 10. As will be explained, channel iron 34 not only provides structural support to bed liner 10, but also aids in the removal of bed liner 10 from the cargo bed of pickup truck 12.

FIG. 3 illustrates bed liner floor 22, which includes a floor inner wall 36 and a floor outer wall 38. As may be seen, outer wall 38 is molded in the form of laterally extending ribs that run the entire width of bed liner floor 22. As may be seen in FIG. 4, floor inner wall 36 includes longitudinal ribs running along the length of bed liner floor 22. As illustrated most clearly in FIG. 3, the peaks of the ribs of floor outer wall 38 periodically contact the valleys of the ribs of floor inner wall 36. During the rotational molding process, while the material used to fabricate bed liner 10, such as LLDPE, is quite hot, the peaks of the ribs of floor outer wall 38 and the valleys of the ribs of floor inner wall 36 tend to bond together at the periodic points of contact, forming bonding points 40, giving extra strength and support to bed liner floor 22. A channel iron 42, shown in phantom in FIG. 3, may be embedded in one or more of the lateral ribs of floor outer wall 38 of bed liner floor 22, and is preferably positioned in the rearmost lateral rib formed by floor outer wall 38. A solid iron bar may alternatively be used in place of channel iron 42. The preferred dimensions for channel iron 42 are approximately 1½ inches by 1½ inches. FIG. 4 shows channel iron 42 positioned in a lateral rib formed by floor outer wall 38, extending between first outer wall 26 and second outer wall 30.

Figure 8:
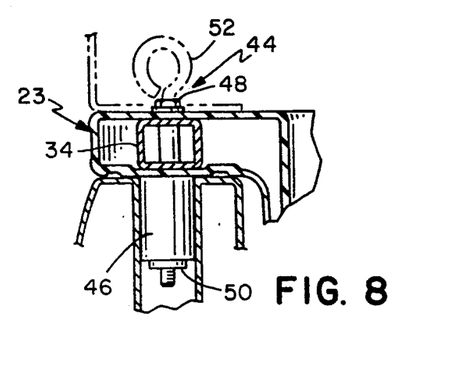
FIG. 8 is a section view similar to FIG. 6 showing an attachment means for attaching the removable bed liner to the pickup truck.

Vehicles with which removable bed liner 10 are likely to be used, such as pickup truck 12, are customarily equipped with stake holes (not shown) by means of which various utility devices such as camper tops and other toppers are fastened to pickup truck 12 over its cargo bed. FIG. 8 illustrates a preferred fastening means 44, including a rubber gasket 46 positioned in the stake hole, through which passes bolt 48 to which is fastened a threaded nut 50. As bolt 48 is tightened, rubber gasket 46 expands, locking bed liner 10 to pickup truck 12. An optional eye bolt 52 is also indicated in FIG. 8 in phantom.

First and second side storage compartments 14, 16 include first and second hinged covers 54, 56, respectively. When in the closed position, hinged covers 54, 56 are restrained as by rubber clasps 57 that cooperate with raised members 59. As most clearly shown in FIGS. 2 and 4, the bottom side of hinged covers 54, 56 includes groove 58 to mate with raised peripheral lip 60 surrounding the openings to side storage compartments 14, 16. Similarly, third and fourth hinged covers 62, 64, respectively, protect first and second end storage compartments 18, 20. Third and fourth hinged covers 62, 64, as are first and second hinged covers 54, 56, are preferably rotationally molded of the same material as bed liner 10. Molded integrally with third and fourth hinge covers 62, 64 is a laterally projecting hinge pin 67 that is matable with hinge pin receivers 69. Hinge pin receivers 69 are integrally molded with and project inwardly from flange 23 of be liner 10. Two hinge pin receivers 69 are required for each hinge pin 67. The bottom side of third and fourth hinged covers 62, 64 also preferably includes a groove (not shown) to mate with raised peripheral lip 66, which surrounds the openings to first and second end storage compartments 18, 20. Third and fourth hinged covers 62, 64 may be latched in the closed position as by latch member 65.

Figure 5:
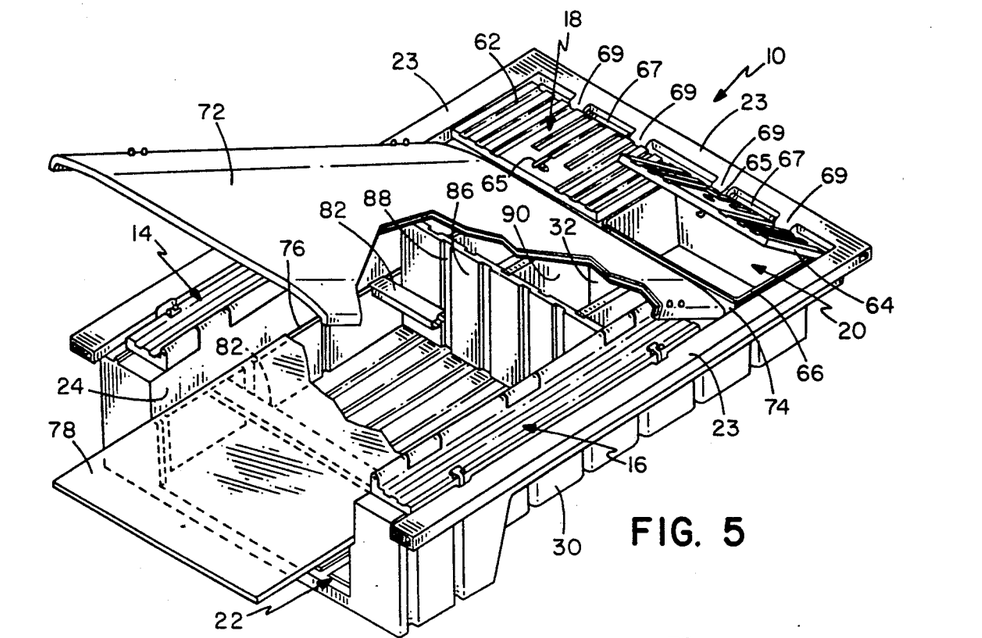
FIG. 5 is a partially cutaway, perspective view of the preferred embodiment of the present invention, including certain optional features.
Figure 6:
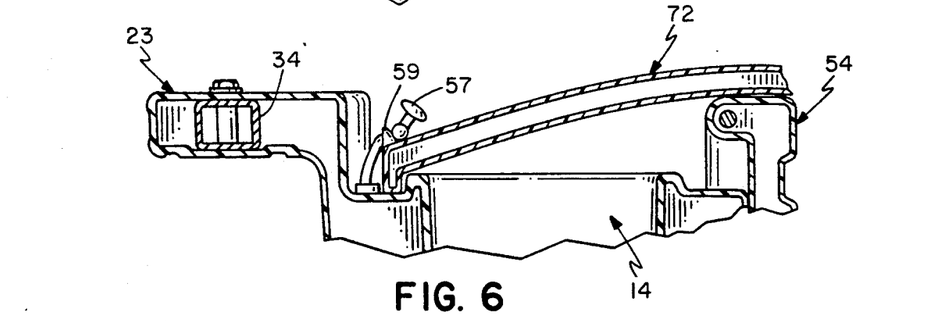
FIG. 6 is a section view similar to FIG. 2 showing an optional tonneau cover fastened in place and the side compartment cover in the open position.

As shown in FIG. 1, another raised lip 68, partially continuous with raised lip 60 of side storage compartments 14, 16, generally surrounds the storage area 70 defined by bed liner floor 22 and inner walls 24, 28, 32. As shown in FIG. 5, optional tonneau cover 72 rests over storage area 70 as well as side storage compartments 14, 16. Tonneau cover 72 is preferably rotationally molded of the same material used for bed liner 10, and may be hingedly attached as by pillow blocks (not shown) mounted t horizontal surface 74 between raised lip 66 surrounding end storage compartments 18, 20, and raised lip 68 about storage area 70. Tonneau cover 72 is also supplied with raised members 59 similar to those found on first and second hinged covers 54, 56. In use, first and second hinged covers 54, 56 must be in their open positions, as indicated in FIG. 6. Tonneau cover 72 may then be lowered to the closed position and latched in place using the same rubber clasps 57 used by first and second hinged covers 54, 56. With tonneau cover 72 closed and latched, the contents of storage area 70 and first and second side storage compartments 14, 16 are protected from rain falling on removable bed liner 10. Any such rain will run off tonneau cover 72 and into the channels formed by raised lip 68, and will not be able to reach the contents of storage area 70 or first and second side storage compartments 14, 16. Tonneau cover 72 also may be supplied with a locking latch member (not shown) that cooperates with tailgate 25 of pickup truck 12 to lock safely the contents of storage area 70 and side storage compartments 14, 16 when bed liner 10 has been removed from pickup truck 12.

As shown in FIGS. 1, 4 and 5, a peripheral ledge 76 projects from first and second inner walls 24, 28 and also preferably from front inner wall 32. Peripheral ledge 76 accommodates a horizontal dividing member such as a sheet of plywood 78, permitting storage area 70 to be horizontally divided into upper and lower storage areas. Also formed in first and second inner walls 24, 28 may be notches 80 sized to accommodate a support structure such as wooden beam 82, illustrated in FIG. 5 Beams 82 may be used, for example, to tie small items being transported in storage area 70 securely in position, preventing sliding or tipping. Notches 80 preferably support beams 82 below the horizontal plane defined by peripheral ledge 76 so that support beams 82 and plywood sheet 78 may be used simultaneously.

Figure 9:
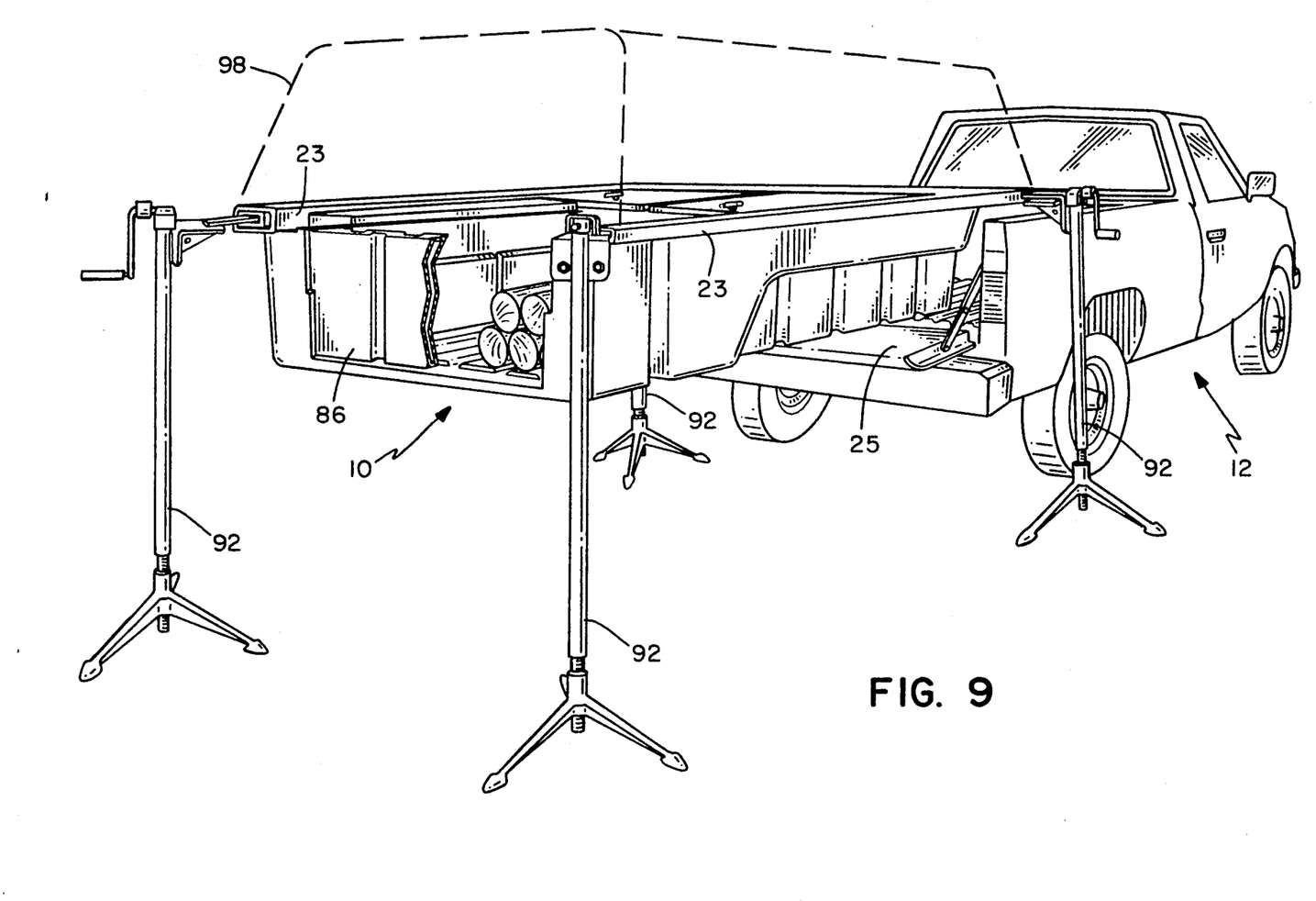
FIG. 9 is a partially cutaway, perspective view of the removable bed liner mounted on jacks after being removed from a pickup truck.

Also projecting inwardly from first and second inner walls 24, 28 and also preferably from front inner wall 32 are vertical slots 84. As shown in FIG. 5, primary vertical divider 86 is sized to extend across storage area 70 and divide storage area 70 into smaller areas. As shown in FIG. 9, primary vertical divider 86 also may serve as a temporary tailgate when bed liner 10 is in storage. It also may serve as a tailgate when bed liner 10 is in use in pickup truck 12. Primary vertical divider 86 is preferably rotational molded of the same material used for bed liner 10, and also includes vertical slots 88 that cooperate with slots 84 of front inner wall 32 to retain secondary vertical dividers 90. Secondary vertical dividers 90 may extend between and cooperate with either primary vertical divider 86 and front inner wall 32 or two primary vertical dividers 86.

Figure 10:
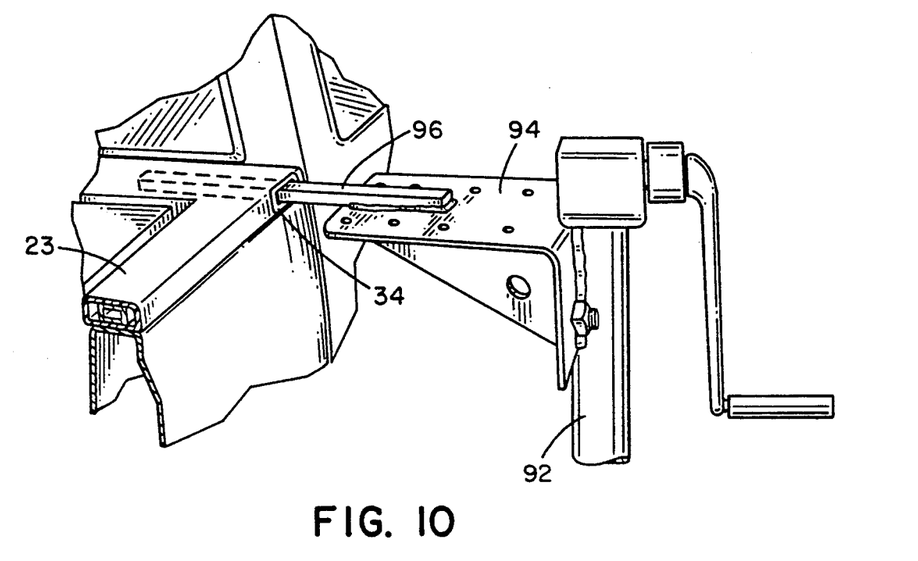
FIG. 10 is a perspective view of a jack in position in one of the forward lifting slots to begin removing the removable bed liner from the pickup truck.
Figure 11:
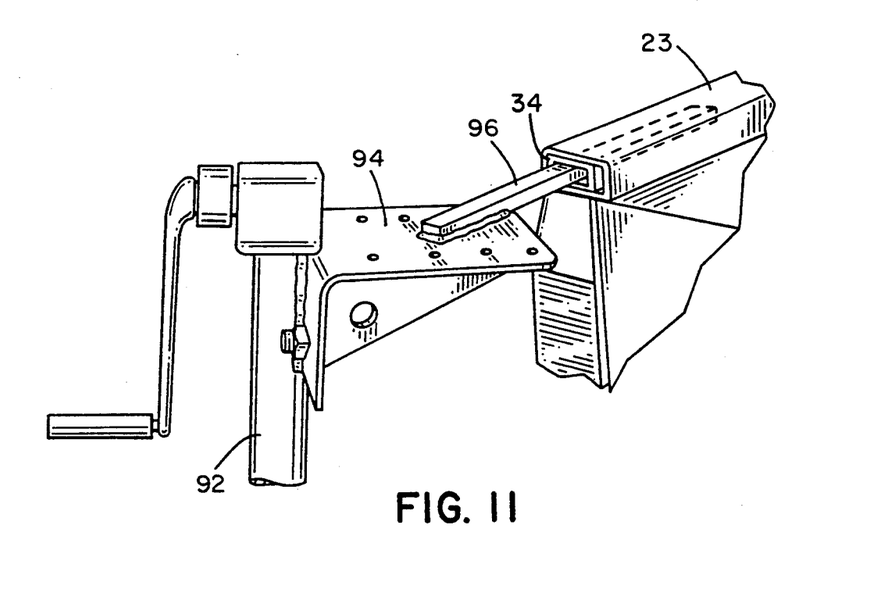
FIG. 11 is a perspective view of a jack in position in one of the rearward lifting slots to begin removing the removable bed liner from the pickup truck.

FIGS. 9-11 illustrate the use of lifting means such as jacks 92 for removing bed liner 10 from the cargo bed of pickup truck 12. Jacks 92 include upper support plates 94 to which are fastened as by welding a projecting portion such as steel rod 96 that is insertable within channel iron 34 contained in flange 23. The preferred embodiment of the invention requires four such jacks 92, although it is possible to envision alternate embodiments operable with a greater or lesser number.

Figure 7:
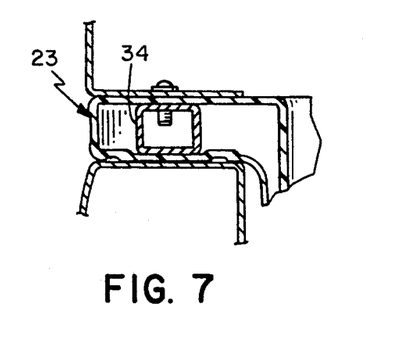
FIG. 7 is a section view from the same perspective as that of FIG. 2, showing only the flange of the removable bed liner, including a portion of a topper affixed thereto.

FIG. 7 illustrates a portion of a camper top or other topper 98 fastened to flange 23 of bed liner 10 as by a screw, pop rivet or other fastening means 100. As shown in phantom in FIG. 9, topper 98 may remain attached to bed liner 10 after it has been removed from the cargo bed of pickup truck 12.

Figure 12:
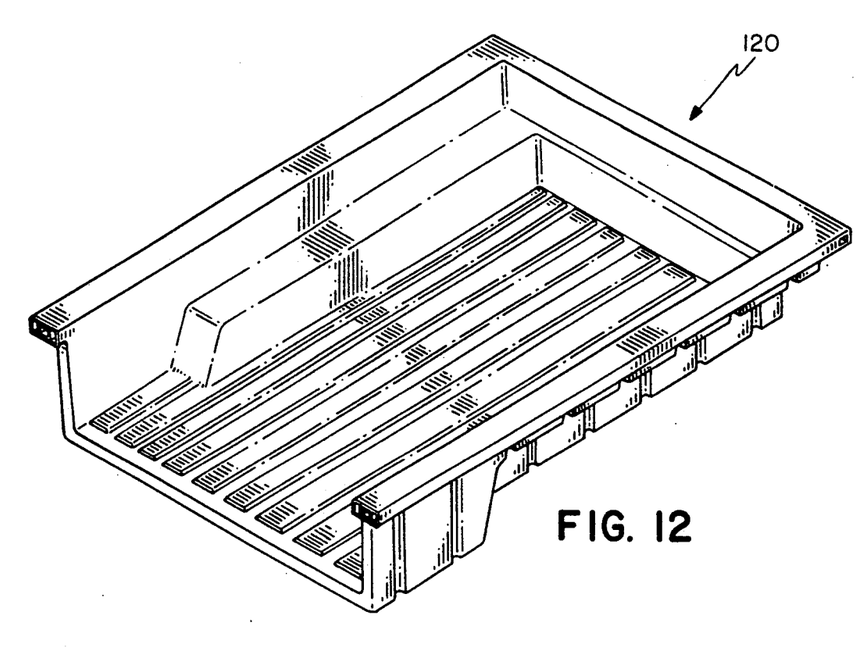
FIG. 12 is a perspective view of a second embodiment of the removable bed liner.
Figure 13:
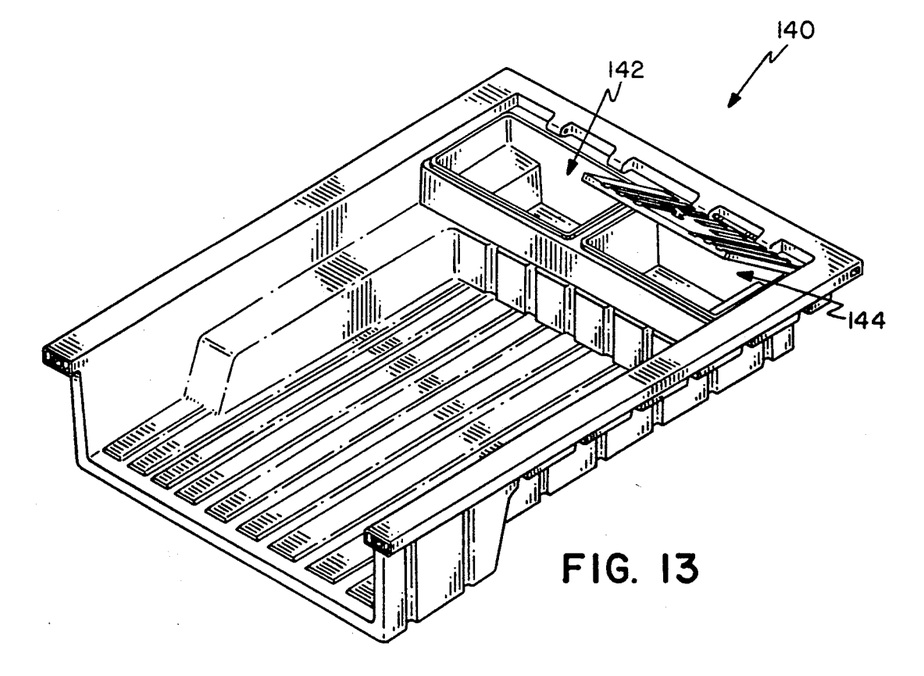
FIG. 13 is a perspective view of a third embodiment of the removable bed liner.

FIGS. 12 and 13 illustrate alternate embodiments of the bed liner. FIG. 12 shows a bed liner 120 having no integral storage compartments, but retaining the same flange structure needed to lift it from the cargo bed of a pickup truck. Similarly, bed liner 140 shown in FIG. 13 includes first and second front storage compartments 142, 144, respectively, but does not include first or second side storage compartments. As with bed liner 120 illustrated in FIG. 12, bed liner 140 retains the same flange structure needed to lift it from the cargo bed of a pickup truck.

The overall dimensions of the preferred embodiment of bed liner 10 are approximately 99½ inches in length by approximately 72¼ inches in width. The overall height of bed liner 10 is approximately 21 inches, and the width of the lower portion of storage area 70 is approximately 39 inches. Side compartment openings are approximately 60 inches long by 5½ inches wide, and front compartment openings are approximately 27¼ inches by 14½ inches. The preferred thickness of flange 23 is approximately 1⅝ inches.

In use, before bed liner 10 may be removed from the cargo bed of pickup truck 12, fastening means 44 must be removed to allow separation of bed liner 10 from pickup truck 12. Note that the contents of bed liner 10 do not need to be removed from it before removing bed liner 10 from pickup truck 12. Next, projecting portions 96 of jacks 92 are inserted into each attachment means, channel iron 34 in flange 23, of bed liner 10. Handle 102 of jack 92 is then turned to elevate bed liner 10 a sufficient distance from the cargo bed of pickup truck 12 to clear the wheel wells that extend into the cargo bed. This step must be repeated with each of the four jacks 92 needed to remove bed liner 10. The removal of bed liner 10 may be handled by one person in just a few minutes. Note FIG. 9, which shows that first and second outer walls 26, 30 are indented a distance approximating the depth and height of a wheelwell of a conventional pickup truck to simplify the removal of bed liner 10 from pickup truck 12. Pickup truck 12 may simply be driven away after lifting bed liner a sufficient distance with jacks 92.

While the preferred embodiments of the invention have been described, it should be understood that various changes, adaptations, and modifications may be made therein without departing from the spirit of the invention and the scope of the appended claims.

What is claimed is:

1. A double wall protective liner for a cargo bed of a vehicle, the cargo bed being defined by a floor wall, first and second opposing vehicle cargo bed sidewalls, first and second vehicle rear wheel wells adjacent the first and second cargo bed sidewalls, respectively, a vehicle cargo bed frontwall, and a vehicle cargo bed tailgate, the protective liner comprising:
    a liner floor portion positionable adjacent to and overlying the floor wall of the vehicle cargo bed, said floor portion having an inner wall and an outer wall;
    first and second generally upright opposably positioned liner sidewalls extending from said liner floor portion, said first and second liner sidewalls each having a front end and a rear end and an inner wall and an outer wall, said first and second liner sidewalls, including said respective front and rear ends, include an upper portion;
    a third generally upright liner sidewall extending from said liner floor portion, intersecting and generally perpendicular to said first and second liner sidewalls, said third liner sidewall having a first end and a second end and an inner wall and an outer wall, said outer wall of said first end of said third liner sidewall intersecting and adjacent to said outer wall of said front end of said first liner sidewall, forming a first corner member, said first corner member having an upper end, and said outer wall of said second end of said third liner sidewall intersecting and adjacent to said outer wall of said front end of said second liner sidewall, forming a second corner member, said second corner member having an upper end, said inner walls of said first, second and third liner sidewalls and said liner floor portion defining a primary storage area;
    a flange, unitary with the protective liner, adjacent to and intersecting said outer walls of said first, second and third liner sidewalls, said flange located adjacent to and in resting relationship with the first and second vehicle cargo bed sidewalls and the vehicle cargo bed frontwall; and
    attachment means integral with said flange, whereby at least one lifting apparatus is attachable to said attachment means to lift the protective liner from the vehicle cargo bed.

2. A protective liner as recited in claim 1, said attachment means further comprising:
    a first attachment portion integral with said flange and located adjacent to said upper end of said first corner member;
    a second attachment portion integral with said flange and located adjacent to said upper end of said second corner member;
    a third attachment portion integral with said flange and located adjacent to said upper portion of said rear end of said first liner sidewall; and
    a fourth attachment portion integral with said flange and located adjacent to said upper portion of said rear end of said second liner sidewall, whereby at least one lifting apparatus may be fastened to said first, second, third and fourth attachment means to lift the protective liner from the vehicle cargo bed.

3. A protective liner as recited in claim 1, further comprising:
    at least one frontwall storage compartment adjacent said liner floor portion and extending between said inner wall and said outer wall of said third liner sidewall.

4. A protective liner as recited in claim 3, wherein:
    said at least one frontwall storage compartment is unitary with the protective liner.

5. A protective liner as recited in claim 1, further comprising:
    at least one first sidewall storage compartment adjacent said liner floor portion and extending between said inner wall and said outer wall of said first sidewall.

6. A protective liner as recited in claim 5, wherein:
    said at least one first sidewall storage compartment is unitary with the protective liner.

7. A protective liner as recited in claim 1, further comprising:
    at least one second sidewall storage compartment adjacent said liner floor portion and extending between said inner wall and said outer wall of said second sidewall.

8. A protective liner as recited in claim 7, wherein:
    said at least one second sidewall storage compartment is unitary with the protective liner.

9. A protective liner as recited in claim 3, further comprising:
    at least one first sidewall storage compartment adjacent said liner floor portion, extending between said inner wall and said outer wall of said first sidewall, and adjacent said frontwall storage compartment.

10. A protective liner as recited in claim 9, wherein:
    said frontwall storage compartment and said first sidewall storage compartment are unitary with the protective liner.

11. A protective liner as recited in claim 3, further comprising:
    a second sidewall storage compartment adjacent said liner floor portion, extending between said inner wall and said outer wall of said second sidewall, and adjacent said frontwall storage compartment.

12. A protective liner as recited in claim 11, wherein:
    said frontwall storage compartment and said second sidewall storage compartment are unitary with the protective liner.

13. A protective liner as recited in claim 11, further comprising:

a first sidewall storage compartment adjacent said liner floor portion, extending between said inner wall and said outer wall of said first sidewall, and adjacent said frontwall storage compartment.

14. A protective liner as recited in claim 13, wherein: said frontwall storage compartment, said second sidewall storage compartment and said first sidewall storage compartment are unitary with the protective liner.

15. A protective liner as recited in claim 1, further comprising:
means for removably fastening the protective liner to the vehicle.

16. A protective liner as recited in claim 1, further comprising:
means for restraining cargo movement within said primary storage area.

17. As protective liner as recited in claim 16, said means for restraining cargo movement comprising:
a plurality of opposably positioned pairs of slots inwardly directed from said inner walls of said first and second liner sidewalls, one channel of each said pair of slots disposed on each of said inner walls of said first and second liner sidewalls; and
a cargo restraining member extendable between and removably nestingly engageable with one of pairs of slots, placement of said cargo restraining member in one of said pairs of slots resulting in the creation of a secondary storage area.

18. A protective liner as recited in claim 17, said means for restraining cargo movement further comprising:
a plurality of channels inwardly directed from said inner wall of said third liner sidewall;
a plurality of channels positioned on at least one side of said cargo restraining member, each said restraining member channel forming a pair of secondary channels with a said third liner sidewall channel; and
at least one secondary cargo restraining member extendable between and removably nestingly engageable with one of said pairs of secondary channels.

19. A protective liner as recited in claim 1, further comprising:
means for horizontally dividing said primary storage area.

20. A protective liner as recited in claim 19, said means for horizontally dividing said primary storage area comprising:
first and second inwardly projecting, upwardly disposed ledges on each of said inner walls of said first and second liner sidewalls, respectively, said first and second ledges positioned equidistantly from said liner floor portion; and
a horizontal dividing member extending between said inner walls of said first and second liner sidewalls, said horizontal dividing member resting upon said first and second inwardly projecting ledges.

21. A protective liner as recited in claim 20, further comprising:
a third inwardly projecting, upwardly disposed ledge on said inner wall of said third liner sidewall, said third ledge forming a continuous surface coplanar with said first and second ledges, and forming an additional resting surface for said horizontal dividing member.

22. A protective liner as recited in claim 1, further comprising:
a multiplicity of opposably positioned pairs of upwardly exposed notches inwardly directed from said inner walls of said first and second liner sidewalls, one notch of each said pair of notches disposed on each of said inner walls of said first and second liner sidewalls; and
at least one cargo securing member extendable between and removably nestingly engageable with a corresponding number of said pairs of notches, whereby cargo resting in said primary storage area is releasably fastenable to said cargo securing member, thus reducing the risk of loss of or damage to the cargo contained therein.

23. A protective liner for a cargo bed of a vehicle, the cargo bed being defined by a floor wall, first and second opposing vehicle cargo bed sidewalls, first and second vehicle rear wheel wells adjacent the first and second cargo bed sidewalls, respectively, a vehicle cargo bed frontwall, and a vehicle cargo bed tailgate, the protective liner comprising:
a liner floor portion positionable adjacent to and overlying the floor wall of the vehicle cargo bed;
first and second generally upright opposably positioned liner sidewalls extending from said liner floor portion, said first and second liner sidewalls each having a front end and a rear end;
a third generally upright liner sidewall extending from said liner floor portion, intersecting and generally perpendicular to said first and second liner sidewalls, said third liner sidewall having a first end and a second end, said first end of said third liner sidewall intersecting and adjacent to said front end of said first liner sidewall, forming a first corner member, and said second end of said third liner sidewall intersecting and adjacent to said front end of said second liner sidewall, forming a second corner member, said first, second and third liner sidewalls and said liner floor portion defining a primary storage area;
a flange, unitary with the protective liner, adjacent to and intersecting said first, second and third liner sidewalls, said flange located adjacent to and in resting relationship with the first and second vehicle cargo bed sidewalls and the vehicle cargo bed frontwall; and
at least one attachment means located entirely within said flange, whereby at least one lifting apparatus is attachable to said at least one attachment means to lift the protective liner from the vehicle cargo bed.

* * * * *